May 28, 1929.  A. POWELSKI  1,714,728
JOURNAL BEARING
Filed March 30, 1927   3 Sheets-Sheet 2

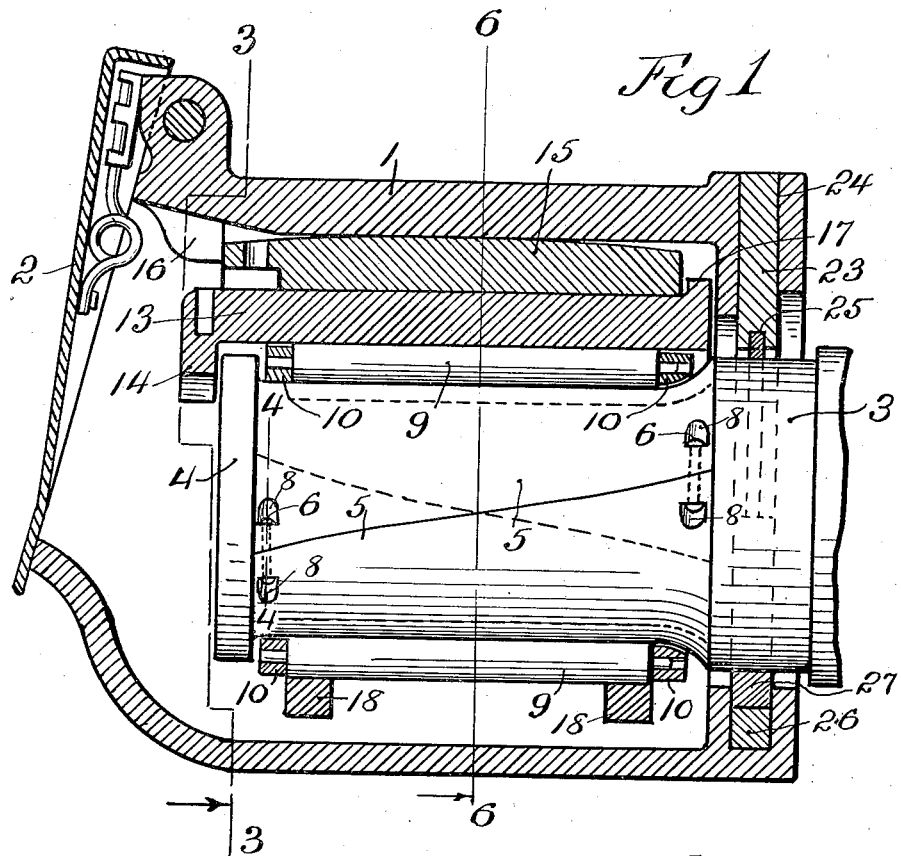
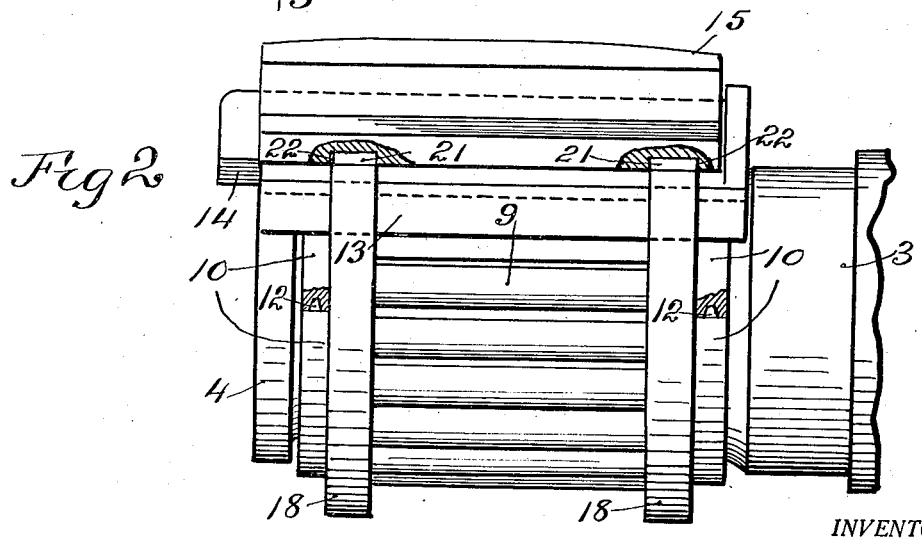

INVENTOR.
Albert Powelski
BY Warren D. House
His ATTORNEY.

Witness:
R. E. Hamilton

May 28, 1929.    A. POWELSKI    1,714,728
JOURNAL BEARING
Filed March 30, 1927    3 Sheets-Sheet 3

Witness:
R. C. Hamilton

INVENTOR.
Albert Powelski
BY Warren D. House,
His ATTORNEY.

Patented May 28, 1929.

1,714,728

UNITED STATES PATENT OFFICE.

ALBERT POWELSKI, OF KANSAS CITY, KANSAS.

JOURNAL BEARING.

Application filed March 30, 1927. Serial No. 179,487.

My invention relates to improvements in journal bearings.

One of the objects of my invention is to provide a novel journal bearing adapted for use in connection with car axle boxes and with journals having the usual peripheral grooves and end flanges, the journal bearing having novel bearing members arranged to form a race for bearing rollers.

A further object of my invention is the provision of novel means for retaining the bearing members in their proper operative positions.

A further object of my invention is to provide a novel journal bearing which is simple, strong, durable, not liable to get out of order, which is cheap to make, which permits of the easy insertion of new parts for those which become worn, which is adapted to standard equipment, with little modification thereof.

Still another object of my invention is to provide a novel bearing sleeve adapted to form an efficient bearing surface for bearing rollers, and which is adapted for use on a journal of the type having a peripheral groove and end flange.

The novel features of my invention are hereinafter fully described and claimed.

In the accompanying drawing, which illustrates the preferred embodiment of my invention, Fig. 1 is a central vertical sectional view, partly broken away, showing my improved journal bearing in operative position in connection with the usual type of axle box and journal, an end portion only of the latter being shown.

Fig. 2 is a side elevation, partly broken away, of the same with the axle box removed.

Similar reference characters designate similar parts in the different views.

1 designates an axle box of the usual standard type having at its outer end the usual spring closed lid 2.

3 designates an ordinary car journal of the peripherally grooved type having at its outer end an annular peripheral flange 4.

Figure 4:
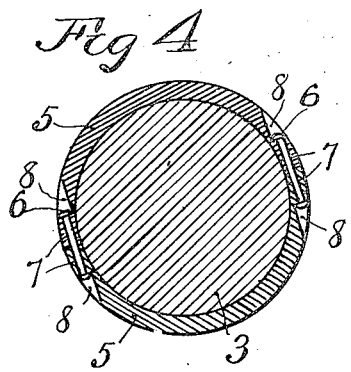
Fig. 4 is a section on the line 4—4 of Fig. 1.
Figure 5:
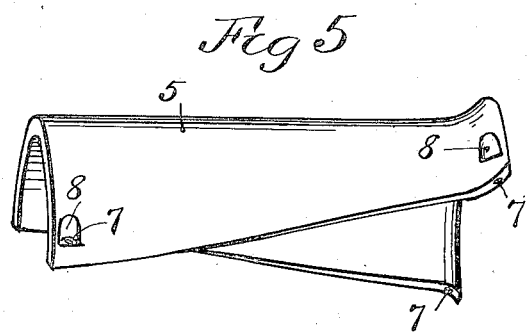
Fig. 5 is a perspective view of one of the sleeve members.

Mounted in the peripheral groove of the journal 3 at the inner side of the end flange 4, is a bearing sleeve comprising two members 5, which are alike in construction, size and form, and each of which is internally and externally semi-circular in cross section and which has its longitudinal edges abutting against the longitudinal edges of the other sleeve member and inclined to the axis of the journal 3, Figs. 1, 4 and 5.

After the sleeve members 5 have been fitted on the journal, they may be fastened together in any suitable manner, as by rivets 6, which extend respectively through holes 7, Figs. 4 and 5, four of which are provided in each member 5, and which are disposed two adjacent to each end of the member and respectively adjacent to the longitudinal edges thereof, each hole 7 terminating at one end in the adjacent longitudinal edge of the member and terminating at its other end in a peripheral recess 8. The rivets 6 are thus prevented from interfering with longitudinal bearing rollers 9, which are arranged around and are adapted for travel on the periphery of the bearing sleeve.

To retain the rollers 9 apart, they may be mounted in a two part cage, each part being a unit which is insertible and removable independently of the other part. Each part of the cage comprises two half rings 10, which are connected by longitudinal rods 11, Fig. 6. Some of the rollers 9 have their ends respectively rotatable in the half ring 10 of one part of the cage, the ends of the other rollers being rotatable in the half ring of the other part of the cage.

Adjacent ends of adjacent half rings 10 may be connected together by dowel pins 12, each of which is mounted in one half ring and is adapted to enter a hole provided in the other half ring, Fig. 2. This connection holds the two parts of the cage against relative longitudinal movement.

Figure 9:
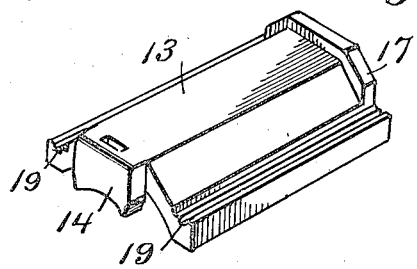
Fig. 9 is a perspective view of the upper bearing member.

Mounted upon the rollers 9 and supported by them, is an upper bearing member 13, Fig. 9, which has an inner arcuate surface against which the rollers 9 have contact, see Fig. 9.

The front end of the upper bearing member 13 is provided with a downwardly extending lip 14, which extends in front of and is adapted to have contact with the adjacent end of the journal 3, for limiting the inward movement of the box 1 with respect to the journal.

Figure 3:
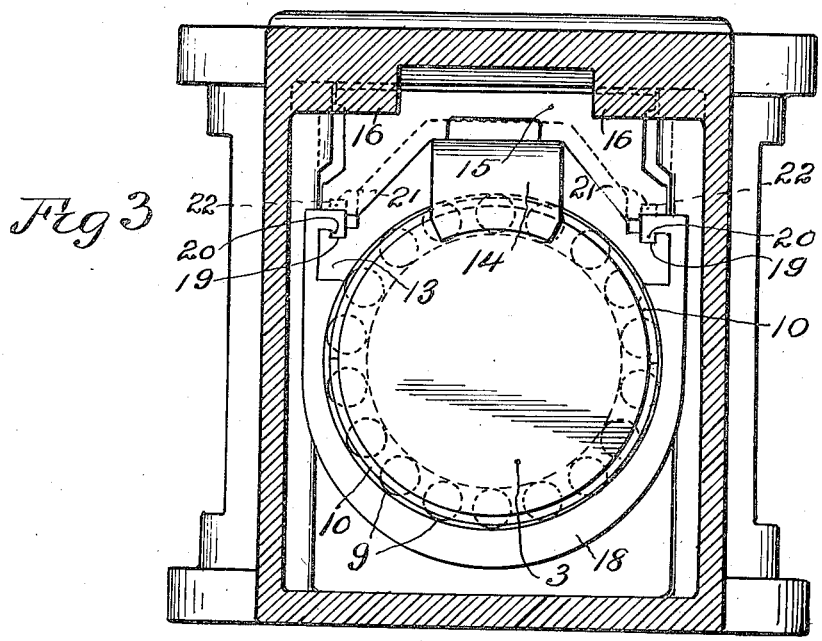
Fig. 3 is a section on the line 3—3 of Fig. 1.
Figure 7:
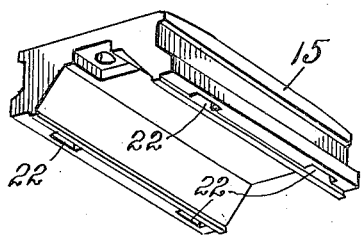
Fig. 7 is a perspective view of my improved wedge.

Mounted on the upper bearing member 13 is a wedge 15, Fig. 7, the forward end of which is at the rear of and is adapted to engage an abutment, comprising two dowwardly extending lugs 16, Figs. 1 and 3, upon the under side of the roof of the box 1 adjacent to the outer end thereof.

The rear end of the upper bearing member is provided with an upwardly extending flange 17, which is adapted to engage the inner end of the wedge 5 for limiting the outward movement of said bearing member 13.

Two U-shaped lower bearing members 18, which are similar in construction, and which are disposed one in front of the other, have their arms respectively embracing opposite longitudinal edges of the upper bearing member 13 on which the lower bearing members 18 are longitudinally slidable.

Figure 8:
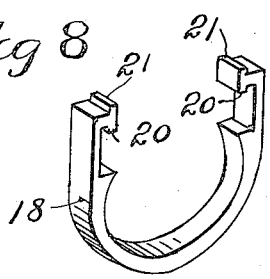
Fig. 8 is a perspective view of one of the lower bearing members.

The upper side of the bearing member 13 is provided respectively adjacent to its longitudinal edges with two longitudinal grooves 19 which extend rearwardly from the front end of the member 13 and are spaced from the side edges thereof. Each arm of each bearing member 18 has at its inner side a downwardly extending flange 20, Figs. 3, 6 and 8, which is slidable in the adjacent groove 19.

For holding each bearing member 18 from longitudinal movement in either direction in the grooves 19, from its proper operative position, the upper end of each arm of each member 18 is provided with an upwardly extending flange 21, said flanges being adapted to respectively enter four vertical recesses 22 provided in the under side of the wedge 15, Figs. 2, 3, 7 and 8. The flanges 20 and 21, by being located respectively in the grooves 19 and recesses 22, serve the further function of holding the arms of the U shaped member 18 from spreading. This is important as the bearing members 13 and 18 and wedge 15 are spaced, as shown from the side walls of the box to permit lateral swinging of the journal 3 in the box, and without being so held by the upper bearing member 13 and the wedge 15, the arms are liable to spread.

The rear end of the box 1 may be provided with a suitable dust guard, which may comprise an upper member 23, which is removably slidable in a vertical groove 24, which extends downwardly from the top of the box, as shown in Fig. 1.

The lower end of the member 23 is concave and has mounted in it a strip of felt 25 which embraces the journal 3.

A lower member 26 is mounted in the groove 24 and has a concave upper side in which is mounted a strip of felt 27, which is also fitted in the groove 24, and which bears against the journal 3.

Figure 6:
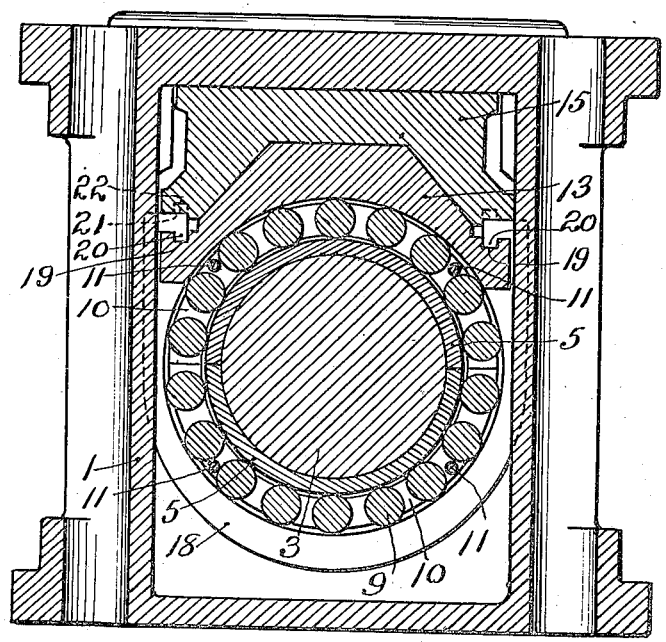
Fig. 6 is a section on the line 6—6 of Fig. 1.

In assembling the journal bearing, the sleeve members 5 are mounted on the journal 3 and secured thereto by inserting and upsetting the ends of the rivets 6, after which the two parts of the cage with the rollers contained therein, are mounted on the sleeve, as shown in Figs. 2 and 6.

The members 18 are then mounted on the member 13 and inserted in the front end of the box, by being slid along in the grooves 19, after which the wedge 15 is slipped over the member 13 and behind the lugs 16, with the flanges 21 of the members 18 disposed in the recesses 22 of the wedge, the box being jacked up to permit of the insertion of the wedge.

The box, with the parts thus mounted in it, is then slipped over the journal 3 with the rollers 9 disposed within the members 13 and 18. The box 1 is then fastened in the usual manner upon its usual support, not shown.

The rear end of the upper bearing member 13 engaging the rear end of the wedge 15 holds the member 13 from outward movement, while the wedge 15 is held by the lugs 16 from outward movement. The lip 14 by engagement of the outer end of the journal 3 limits the movement of the box 1 inwardly.

By having the longitudinal edges of the sleeve members 5 disposed spirally, that is inclined to the axis of the journal, the joints between the members are broken with respect to the rollers 9, so that the latter in revolving around on the sleeve encounter no abrupt edges. The members 5 are hardened and sufficiently resilient to enable them to be sprung onto the journal.

I do not limit my invention to the structure shown and described, as many modifications, within the scope of the appended claims, may be made without departing from the spirit of my invention.

What I claim is:

1. In a journal bearing, two members comprising an upper bearing member and a wedge mounted thereon, and a U-shaped lower bearing member having its arms supported by the upper bearing member and the wedge and said arms having means by which the arms are retained in operative position thereon by engagement with said wedge and by which the arms are held from spreading.

2. In a journal bearing, two members comprising an upper bearing member and a wedge mounted thereon, and a U-shaped lower bearing member having its arms supported by the upper bearing member and interlocked with said wedge, the latter having means by which said arms are held from spreading and sliding.

3. In a journal bearing, an upper bearing member, a wedge mounted thereon having two recesses in its bottom and spaced from the side edges of the wedge, and a lower U-shaped bearing member the arms of which engage and are supported by the upper bearing member and are respectively disposed in said recesses and are held by the wedge from spreading.

4. In a journal bearing, an upper bearing member, having in its upper side two longitudinal grooves spaced from the side edges of said member, and a U-shaped lower bearing member having its arms extending into said grooves and adapted to slidably engage and being supported by the upper bearing member and held thereby from spreading.

5. In a journal bearing, an upper bearing member, a wedge mounted thereon having two recesses in its bottom and spaced from the side edges of the wedge, and a U-shaped lower bearing member having its arms supported by and adapted for slidable engagement with the upper bearing member and respectively disposed in said recesses, and are held by the wedge from spreading.

6. In a journal bearing, an upper bearing member, and a U-shaped lower bearing member having its arms supported by and adapted for slidable engagement with the upper bearing member and interlocked with said upper bearing member so as to be held from spreading.

7. In a journal bearing, an axle box having an abutment, a wedge in said box adapted to have its outer end engage said abutment, an upper bearing member on which said wedge is mounted having means adapted for engagement with the outer end of a journal and having means adapted for engagement with said wedge for limiting its outward movement relatively thereto, and a U-shaped lower bearing member having its arms supported by the upper bearing member and interlocked with said wedge, said interlocking holding the arms from spreading and from sliding movement.

8. In a journal bearing, an axle box having an abutment, a wedge in said box adapted to be engaged and held from outward movement by said abutment and provided with two recesses spaced from the side edges of said wedge, an upper bearing member supporting said wedge and having two lips, one adapted to engage the outer end of a journal and the other adapted to engage the wedge for holding said member from outward movement relatively to said wedge, and a U-shaped lower bearing member having its arms supported by said upper bearing member and respectively disposed in said recesses and held thereby from spreading.

9. In a journal bearing, a journal having at its outer end an annular peripheral flange and an annular groove at the inner side of said flange, and a bearing sleeve fitted on said journal in said groove at the inner side of said flange and comprising two members each internally and externally semi-circular in cross section and having its longitudinal edges respectively abutting against the longitudinal edges of the other member.

In testimony whereof I have signed my name to this specification.

ALBERT POWELSKI.